US008559366B2

(12) United States Patent
Bachir et al.

(10) Patent No.: US 8,559,366 B2
(45) Date of Patent: Oct. 15, 2013

(54) METHOD OF COMMUNICATION, EMITTER AND RECEIVER STATIONS AND ASSOCIATED COMPUTER PROGRAMS

(75) Inventors: Abdelmalik Bachir, London (GB); Ludovic Samper, Lambesc (FR); Dominique Barthel, Bernin (FR)

(73) Assignee: France Telecom, Paris (FR)

( * ) Notice: Subject to any disclaimer, the term of this patent is extended or adjusted under 35 U.S.C. 154(b) by 769 days.

(21) Appl. No.: 12/305,437

(22) PCT Filed: Jun. 19, 2007

(86) PCT No.: PCT/FR2007/051475
§ 371 (c)(1),
(2), (4) Date: Oct. 12, 2009

(87) PCT Pub. No.: WO2007/148017
PCT Pub. Date: Dec. 27, 2007

(65) Prior Publication Data
US 2010/0054182 A1    Mar. 4, 2010

(30) Foreign Application Priority Data

Jun. 20, 2006    (FR) ..................................... 06 05492

(51) Int. Cl.
*H04W 4/00* (2009.01)
(52) U.S. Cl.
USPC ......................................................... 370/328
(58) Field of Classification Search
USPC ......................................................... 370/328
See application file for complete search history.

(56) References Cited

U.S. PATENT DOCUMENTS

2003/0054807 A1* 3/2003 Hsu et al. ....................... 455/414
2003/0101387 A1* 5/2003 Lee ................................ 714/704

OTHER PUBLICATIONS

NPL document "Wake-Up-Frame Scheme for Ultra Low Power Wireless Transceivers", Global Telecommunications Conference, 2004. GLOBECOM '04., Nov. 29-Dec. 3, 2004.*
Bachir et al., "Abstract Frames for Reducing Overhearing in Wireless Sensor Networks," Networking 2006, Networking Technologies, Services, and Protocols; Performance of Computer and Communication Networks; Mobile and Wireless Communications Systems, Lecture Notice in Computer Science, LNCS, Springer-Verlag, BE, 3976, pp. 880-891 (2006).
Shi et al., "Wake-Up-Frame Scheme for Ultra Low Power Wireless Transceivers," Global Telecommunications Conference, 2004, Globecom'04, IEEE, Dallas, TX, USA, Nov. 29-Dec. 3, 2004, Piscataway, NJ, USA, IEEE, pp. 3619-3623 (Nov. 29, 2004).

* cited by examiner

*Primary Examiner* — Derrick Ferris
*Assistant Examiner* — Majid Esmaeilian
(74) *Attorney, Agent, or Firm* — Drinker Biddle & Reath LLP

(57) ABSTRACT

A method of communication, on a radio channel, between at least two nodes is disclosed. This method is adapted for emitting on the channel in an alternating manner, comprising formulating, by one of the two nodes, termed the emitter, a signal comprising a preamble comprising a series of frames, followed by the data frame, at least one first frame of the preamble comprising a copy of the data frame and indicating a number of frames of the preamble separating this first frame from the data frame and emitting, by the emitter node, of the signal thus formulated on the radio channel.

16 Claims, 3 Drawing Sheets

METHOD OF COMMUNICATION, EMITTER AND RECEIVER STATIONS AND ASSOCIATED COMPUTER PROGRAMS

CROSS-REFERENCE TO RELATED APPLICATIONS

This application is the U.S. national phase of the International Patent Application No. PCT/FR2007/051475 filed Jun. 19, 2007, which claims the benefit of French Application No. 06 05492 filed Jun. 20, 2006, the entire content of which is incorporated herein by reference.

FIELD OF THE INVENTION

The present invention relates to communication techniques used in telecommunication networks. It applies particularly, but not exclusively, in ad hoc networks.

BACKGROUND OF THE INVENTION

Ad hoc networks are communication networks devoid of fixed infrastructure. A certain number of wireless stations are equipped with radio emission and/or reception means and with appropriate protocols to form the nodes of the ad hoc network.

These stations making up the ad hoc network can be in the form of fixed or portable computers, pocket computers, mobile telephones, vehicles, electrodomestic appliances, etc. The emission-reception means can also be associated with simple objects such as sensors or actuators. An ad hoc network of sensors thus makes it possible to perform information collection for example with a view to monitoring or controlling installations.

The success of ad hoc networks depends a great deal on the lifetime of the stations constituting the nodes of the network. Energy saving is a crucial factor for designing long-lifetime sensor networks, in particular because the nodes are generally powered by cells which are generally expensive and difficult, or even impossible, to replace or recharge.

The access protocols for a conventional transmission medium (for example IEEE 802.11), require that the radio receivers of the stations be turned on permanently, always ready to receive the signal. This "ready to receive" mode consumes a great deal of energy. But if there is no transmission on the channel, the energy is wasted by this passive listening (or "idle listening"). This problem is particularly crucial in sensor networks with light traffic of the ad hoc type where the channel is free most of the time.

In order to solve this problem, procedures exist which make it possible to reduce the cost overhead of passive listening. The expression "passive listening" is understood to denote energy-consuming but fruitless active listening to a radio channel by a receiver node, that is to say listening without receiving any signal intended for this receiver node during listening.

Figuring among the known procedures are those according to which a receiver node listens to the radio channel intermittently. The emitted signals then generally comprise a preamble followed by a data frame. Such procedures are called preamble sampling techniques.

Figure 1:
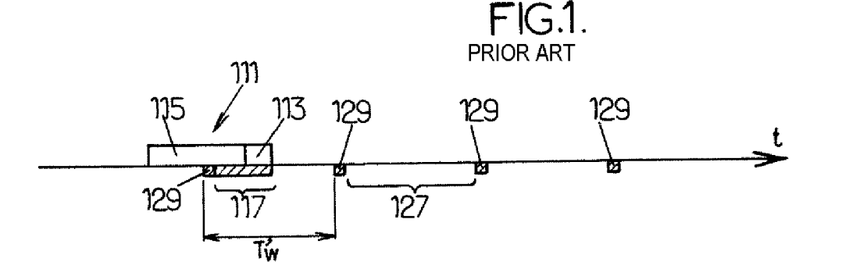
FIG. 1 shows a signal which is emitted on the radio channel by an emitter node destined for a receiver node according to a preamble sampling protocol.

FIG. 1 shows in a schematic manner, along the time axis t, a signal 111 which is emitted on the radio channel by an emitter node E destined for a receiver node R according to such a preamble sampling protocol. The signal 111 comprises a preamble 115, for example a frame which contains repetitions of known bit patterns, and a data frame 113.

From the outset it will be noted that the "active radio listening mode" of a node corresponds to the operation of the node when its radio reception means are activated, consume energy and are therefore able to receive a signal, if any, transmitted to the node, while the "inactive radio listening mode" corresponds to the operation of the node when its radio reception means are on standby and do not consume any energy.

The receiver node R, like each receiver node of the network, is in active radio listening mode (radio turned on) for brief and periodic waking moments, of determined duration, represented by the squares 129 along the time axis t. The time separating the start of two consecutive wakeup moments 129 is equal to T'w. These wakeup moments 129 are spaced out by long inter-waking periods 127, during which the receiver node is in inactive radio listening mode (radio turned off): no energy is then consumed for a radio listening task. The wakeup moments of the receiver nodes are not necessarily concomitant.

During the wakeup moments 129, the receiver node R switches to active radio listening mode for the moment so as to listen to the channel and determine whether there is a signal transmitted on the channel.

If the receiver node R determines that the channel is free, it returns to an inactive radio listening state (radio turned off) at the conclusion of the moment 129. On the other hand, if it detects, at the listening moment 129, the presence of at least one determined pattern of bits, it deduces therefrom the presence of a preamble on the channel and it remains in active radio listening mode until it receives the data frame 113 which follows the preamble 115 (period 117), if appropriate beyond the listening moment 129.

After receiving the data 113, the receiver node R returns to an inactive radio listening state.

Thus, in protocols of this kind, a node spends most of its time in inactive radio listening mode so as to reduce the passive listening and therefore save energy.

Additionally, when a node wishes to dispatch a data frame, it first listens to the channel. If it determines that the channel is occupied, it continues to listen until the channel is freed. On the other hand, if it determines that the channel is free, it dispatches a preamble, then the data frame. The duration of the preamble must be at least equal to T'w, to ensure that all the potential receiver nodes switch to active listening mode during the emission of the preamble and are thus able to receive the data which follow the preamble.

Thus when a node detects a preamble, to receive the data frame, it must listen to the channel continuously until the data frame is received.

Additionally, the WOR or Wake-on-Radio procedure (Chipcon AS, CC1100/CC2500 Wake on Radio Application Note (Rev 1.0) July 2005), is known, according to which the receiver also listens to the radio channel intermittently, in a manner similar to the receiver R of the procedure described above.

According to the WOR procedure, when an emitter node E wishes to transmit a data frame 123, it emits a succession of copies of the data frame prior to this data frame.

The WOR procedure, in a first so-called "no acknowledgement" mode, consists of the dispatching by an emitter node E' of n successive copies of the data frame, which is spread over a period greater than the period T"w separating the starts of two successive wakeup moments.

In a second so-called "with acknowledgement" mode, the emitter node E' stops dispatching the data frames as soon as it has received an acknowledgement dispatched by the receiver node R' for which the data frame was intended.

Figure 2:
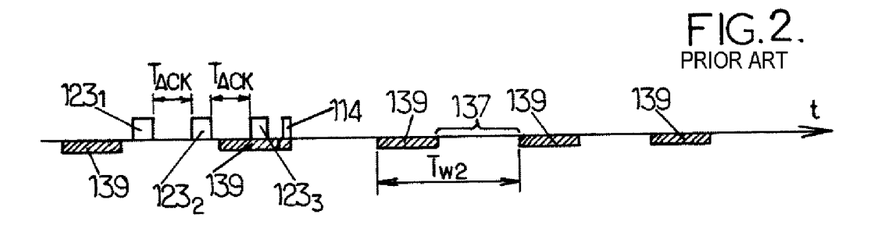
FIG. 2 shows the emitter node dispatching three first copies of the data frame.

Thus in this second mode, the emitter node E' dispatches over the radio channel a maximum of n prior copies $123_1$, $123_2$, ..., $123_n$ of the data frame, n being a predefined number (for example, in the case considered, n is equal to five). After dispatching a data frame $123_i$, the emitter node E' listens to the radio channel during a time span $T_{ACK}$ so as to detect any acknowledgement signal that might be dispatched by the recipient of the data frame. If it does not detect any acknowledgement signal at the termination of this time span $T_{ACK}$, it dispatches a new copy of the data frame and so and so forth until it has dispatched five copies of the data frame. On the other hand, if the emitter node E' receives an acknowledgement signal, it halts the emission of the copies of the data frame.

In the particular case described in FIG. 2, the emitter node E' has dispatched three first copies of the data frame $123_1$, $123_2$ and $123_3$. During the channel listening following the emission of the third copy of the data frame, the emitter node E' detects the transmission on the channel of an acknowledgement signal 114 dispatched by the data frame recipient node R'. It therefore does not dispatch any fourth and fifth copies of the data frame.

Receiver node side, the receiver node R', is in active radio listening mode (radio turned on) during waking moments represented by the squares 139 along the time axis t, which are spaced out by long inter-waking periods 137. The duration separating the starts of two successive wakeup moments is equal to $Tw_2$ seconds, during which the receiver node R' is in inactive radio listening mode.

Every $Tw_2$ seconds, the receiver node R' wakes up to check whether there is a signal transmitted on the channel. For this purpose, the node switches to active radio listening mode during the period 139 to listen to the channel. If the node determines that the channel is free, it returns to an inactive radio listening state (radio turned off). On the other hand, if it detects, during the listening period 139, that the channel is occupied, it performs the necessary operations (detection of header bits indicating a data frame, detection of the synchronization bits, checking of non corruption of frame) to receive in its entirety and correctly a data frame transmitted on the radio channel. After correct receipt of the data frame, the receiver node R' dispatches an acknowledgement signal, then returns to an inactive radio listening state.

With reference to FIG. 2, the receiver node R' has not been able to correctly receive the first copy $123_1$ of the data frame dispatched by the emitter node E', since it was not in active radio listening mode at the start of the transmission of this copy. The receiver node R' is in inactive listening mode during the transmission of the second copy of the data frame $123_2$. On the other hand, it detects during a wakeup moment 139 the start of the transmission of the third copy $123_3$ of the data frame and remains in active listening mode until the end of the receipt of this third copy. Thereafter, it switches to emission mode to emit on the channel an acknowledgement signal 114 intended for the emitter node E'.

The advantage of this second mode of the WOR procedure is that the dispatching of an acknowledgement signal guarantees proper receipt of the data frame dispatched. In the event of non acknowledgement, the emitter node E' can decide to dispatch the data frame again.

The duration of a wakeup moment 139 is fixed at least equal to the time which separates the start of transmission of a copy of a data frame i and the start of transmission of the next copy i+1, i.e. equal to the sum of the transmission time of a frame and of the time $T_{ACK}$ in the course of which the emitter waits for the acknowledgement signal.

The lighter the traffic, the greater will be the passive listening of the receiver node during these wakeup moments, because the time $T_{ACK}$ is taken into account in the duration of the listening period 139.

A need therefore exists, in particular in the case of the emission of a succession of copies of a data frame before the emission of this data frame, to allow a decrease in the heavily energy-consuming passive listening of the receiver node, while allowing the dispatching by the latter of a signal acknowledging proper transmission of the data frame.

SUMMARY OF THE INVENTION

For this purpose, according to a first aspect, the invention proposes a method of communication, on a radio channel, between at least two nodes adapted for emitting on the channel in an alternating manner, comprising the following steps, with a view to transmitting a data frame:
  formulation, by one of the two nodes, termed the emitter, of a signal comprising a preamble comprising a series of frames, followed by the data frame, at least one first frame of the preamble comprising a copy of the data frame and indicating a number of frames of the preamble separating the said first frame from the data frame;
  emission, by the emitter node, of the signal thus formulated on the radio channel.

The indication of the number allows a receiver node to place itself in inactive listening mode right from receipt of the first frame and to anticipate its wakeup at the termination of the emission of the signal, so as to then dispatch its acknowledgement signal. The passive listening can thus be decreased.

The emission of the signal comprising the data frame can therefore take place en bloc, that is to say there is no period, between the respective emission of two successive copies of the data frame, during which the emitter polls the channel on standby awaiting an acknowledgement signal ($T_{ACK}$ is therefore equal to zero here), the switching of the emitter node into active listening mode to detect an acknowledgement signal taking place only after the dispatching of the complete signal. The duration of the periodic wakeup of listening is consequently decreased with respect to the second mode of the WOR procedure, the consequence of this being a decrease in the nodes passive listening time.

In an embodiment, the method furthermore comprises the following steps, following the receipt, by the other node, termed the receiver, of the said first frame:
  determination, as a function of the number indicated by the frame received, of the time span until the completion of the emission of the data frame of the signal;
  switchover to an inactive radio listening mode of the receiver node during the said determined time span.

The effect of this arrangement is to allow the reduction in passive listening and therefore in energy consumption.

In an embodiment, following the receipt, by the other node, termed the receiver, of a frame of the series of frames, the method comprises the following steps:
  determination, as a function of the number indicated by the said first frame received, of the time span until the completion of the emission of the data frame of the signal;
  emission of an acknowledgement of receipt relating to the said first frame received at the conclusion of the said determined time span.

The receiver node can therefore determine from when the radio channel will no longer be occupied by the transmission of the data frame received and/or at least one of its copies. It does not therefore have to expend energy by polling the channel to detect whether the channel is free, with a view to emitting the acknowledgement signal.

In an embodiment, the method comprises the selection, by a node comprising radio emission means, of a mode between at least one first and one second mode of formulation of a signal comprising a preamble and the data frame, the preamble comprising a series of frames which comprises at least one first frame indicating a number of frames of the series separating the said first frame from the data frame and indicating furthermore the mode selected.

The first mode complies with that indicated above. The frames of the series of frames in the preamble of the signal formulated in accordance with the second mode are of reduced size with respect to the data frame.

The method thereafter comprises the formulation of the signal in accordance with the mode selected, and the emission, by the node, of the signal thus formulated on the radio channel.

Such a method thus makes it possible to adapt the emission on the radio channel, as a function of various factors. The frames emitted in the preamble comprise the necessary information as regards the mode selected to allow the receiver node to receive the data frame, or a copy in the case of the first mode of formulation.

In an embodiment, the method comprises the determination, by the emitter node, of a transmission error rate on the channel, the mode of formulation of the signal being selected by the said node as a function of at least this determined error rate.

The signal formulated is thus particularly suited to the characteristics of the radio channel used.

Advantageously, following the receipt, by the other node, termed the receiver, of a frame of the series of frames, the method comprises the following steps:
  reading of the mode indicated by the frame received;
  determination, as a function of the number of frames indicated by the said frame received, of a time span until the emission of the data frame of the signal;
  switchover to an inactive radio listening mode of the receiver node during a period calculated as a function of the determined time span;
  if the mode indicated by the said frame received is the second mode, switchover to an active radio listening mode of the receiver node at the conclusion of the period calculated so as to receive the said data frame.

This arrangement makes it possible to reduce the passive listening. To receive the data frame, the receiver node does not need to listen to the radio channel until it detects the data frame which follows the preamble.

In an embodiment, the method furthermore comprises the following steps:
  determination, by the other node, termed the receiver, of a transmission error rate on the channel;
  selection, as a function of at least the determined error rate, by the receiver node, of a mode between at least one first and one second mode of receiving a signal comprising a preamble comprising a series of frames and followed by the data frame.

According to this embodiment, in the first mode of reception, if the receiver node detects a transmission of a preamble frame on the channel, the said node remains in active radio listening mode until it receives a correct frame of the preamble or until the receiver node determines that the channel is freed. One speaks of persistent reception. And in the second mode of reception, if the receiver node detects a transmission of a frame of a preamble on the channel, the node switches to inactive radio listening mode after receipt of an incorrect frame of the preamble while at least one frame of the preamble is emitted on the channel after the incorrect frame. One speaks of non-persistent reception. These persistent or non-persistent reception behaviours have effects on the times of the nodes spent in emission and/or reception (and therefore on the energy consumption) and on the reliability of the exchanges, which depend on the probability of error on the channel.

The selection of the mode of reception by a node thus makes it possible to adapt the reception of each node in the network.

Advantageously, a selection by the emitter node between the first and the second mode of formulating the signal is carried out with a view to the exchanges with a neighbouring node as a function of an error rate relating to the channel determined as a function of the exchanges between the said emitter node and the said neighbouring node with the exclusion of the exchanges with the other nodes. This arrangement allows a yet more significant reduction in energy consumption.

Advantageously, a selection by the receiver node between the first and the second mode of receiving the signal is carried out with a view to the exchanges with a neighbouring node as a function of an error rate relating to the channel determined as a function of the exchanges between the said receiver node and the said neighbouring node with the exclusion of the exchanges with the other nodes. This arrangement allows a yet more significant reduction in energy consumption.

In an embodiment, the selection between the first and the second mode of formulating the signal is made as a function of one or more elements from among a value representative of an energy expenditure estimated as a function of an error probability, a value of overall transmission reliability on the network estimated as a function of an error probability, and a fixed transmission reliability threshold value.

In an embodiment, the selection between the first and the second mode of receiving the signal is made as a function of one or more elements from among a value representative of an energy expenditure estimated as a function of an error probability, a value of overall transmission reliability on the network estimated as a function of an error probability, and a fixed transmission reliability threshold value.

Controlled compromises between energy consumption and for example a value of transmission reliability guaranteed by the technical operator of the network can thus be made.

According to a second aspect, the invention proposes an emitter station for forming a node able to emit on a radio communication channel in half-duplex. This emitter station comprises:
  formulation means, adapted for formulating, with a view to transmitting a data frame, a signal comprising a preamble comprising a series of frames, followed by the data frame, at least one first frame of the series of frames comprising a copy of the data frame and indicating a number of frames of the series separating the said first frame from the data frame;
  radio emission means adapted for emitting the signal thus formulated on the radio channel.

According to a third aspect, the invention proposes a receiver station for forming a node able to listen intermittently to a radio channel. This receiver station comprises:
  radio reception means;
  determination means for, during the reception, by the radio reception means, of at least one first frame comprising a copy of a data frame, this first frame being a frame of a series of frames of a preamble of a signal, emitted on the channel, the said signal comprising the said preamble followed by the said data frame, determining, as a function of a number read from the first frame received and indicating a number of frames of the series of frames separating this first frame from the data frame, a time span until the completion of the emission of the data frame of the signal;

control means, adapted for causing the switchover to an inactive radio listening mode of the radio reception means of the node during the determined time span.

According to a fourth aspect, the invention proposes a computer program to be installed in an emitter station for forming a node able to emit on a radio channel. This program comprises instructions for implementing the steps of a method according to the first aspect of the invention and which are incumbent on an emitter station, during an execution of the program by processing means of this emitter station, with a view to transmitting a data frame.

According to a fifth aspect, the invention proposes a computer program to be installed in a receiver station so as to form a node able to listen to the radio channel intermittently. This program comprises instructions for implementing the steps of a method according to the first aspect of the invention and which are incumbent on a receiver station, during an execution of the program by processing means of this receiver station.

BRIEF DESCRIPTION OF THE DRAWINGS

Other characteristics and advantages of the invention will be further apparent on reading the description which follows. The latter is purely illustrative and should be read in conjunction with the appended drawings in which:

FIG. 4b represents the radio activity of a node during the transmission of the signal S represented in FIG. 4a;

FIG. 5b represents the radio activity of a node during the transmission of the signal S' represented in FIG. 5a;

DETAILED DESCRIPTION OF THE INVENTION

Figure 3:
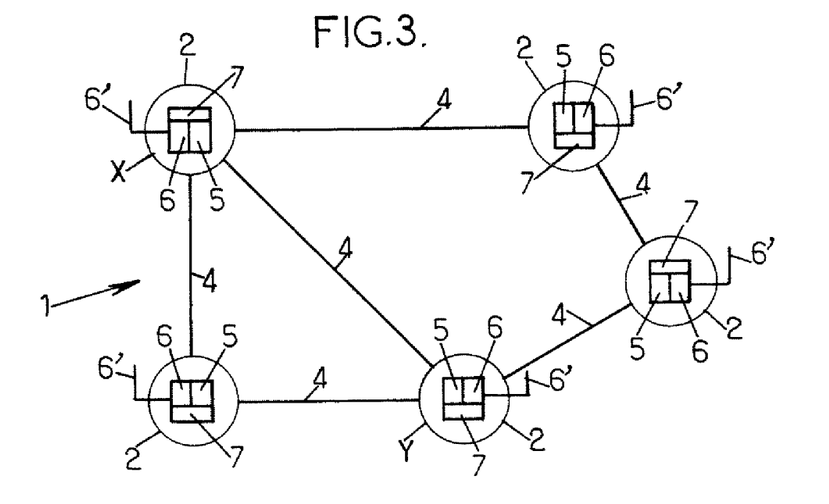
FIG. 3 is a diagram of an ad hoc wireless network to which the invention is applicable.

In FIG. 3 is represented a telecommunications network 1, in the case considered, an ad hoc network, comprising a plurality of emitting-receiver stations 2 each intended to constitute a node of the ad hoc network 1.

A node 2 comprises a processing module 5, an emission/reception module 6 which ensures the processing operations for the physical layer and link layer (layers 1 and 2 of the OSI model) with a view to exchanging signals with a neighbouring node by way of a shared radio channel 4. The emission/reception module 6 is linked to an antenna 6'. The emission/reception module 6 is turned on/off by control means 7.

When a node 2, for example node X, has to transmit a data frame $T_D$ to a neighbouring node Y, the processing module 5 of node X formulates a corresponding signal. This signal comprises a preamble followed by the data frame $T_D$. Then node X transmits by way of its wireless interface module 6 and of its antenna 6' the signal thus formulated on the radio channel 4.

Figure 7:
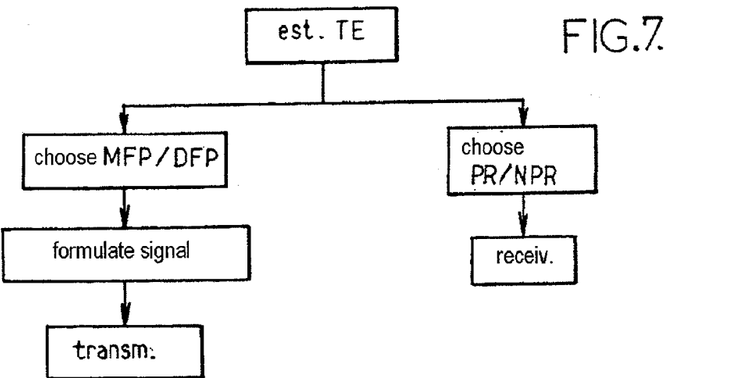
FIG. 7 is a flowchart of the steps of a method according to the invention implemented by a node.

More precisely, with reference to FIG. 7, when a data frame has to be transmitted by a node 2, the processing module 5 of node X firstly estimates a transmission error rate $TE_X$ on the radio channel 4, on the basis of the signals exchanged by node X with the neighbouring nodes.

Then, as a function of this estimated transmission error rate $TE_X$, the processing module 5 of node X selects a mode of formulation of a signal from among two modes of formulation MFP (Micro Frame Preamble) and DFP (Data Frame Preamble). Selection rules are described further on.

The processing module 5 thereafter formulates a signal in accordance with the formulation mode selected.

Figure 4A:
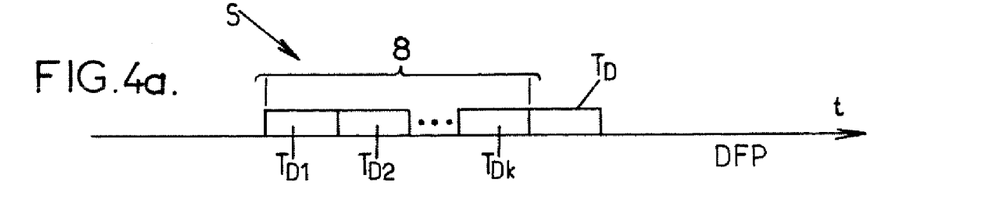
FIG. 4a represents a signal S emitted according to the DFP mode in an embodiment of the invention.

If the formulation mode selected is the DFP mode, then the processing module 5 constructs a signal S. This signal S is represented in FIG. 4a, such as emitted on the radio channel 4 as a function of time t. It comprises a preamble 8 followed by the data frame $T_D$. The preamble 8 comprises a series of k frames (k an integer greater than or equal to 1), $T_{D1}, T_{D2} \ldots T_{Dk}$. Each frame $T_{Di, i=1 \text{ to } k}$ of the series 8 comprises a copy of the data frame $T_D$ and an indication of the number of frames of the series separating the frame $T_{Di}$ from the data frame $T_D$ which follows the preamble 8.

For example in the embodiment considered, each frame $T_{Di, i=1 \text{ to } k}$ comprises the number (k−i) in a dedicated field of the frame.

Then the signal S thus formulated is transmitted to the antenna 6 of node X for emission on the channel 4. The frames $T_{Di, i=1 \text{ to } k}$ and the data frame $T_D$ are emitted en bloc, one after the other and in a continuous manner. In particular, node X does not switch to active radio listening mode between the emission of a frame $T_{Di, i=1 \text{ to } k}$ of the preamble and the emission of the following frame $T_{Di+1}$.

Figure 5A:
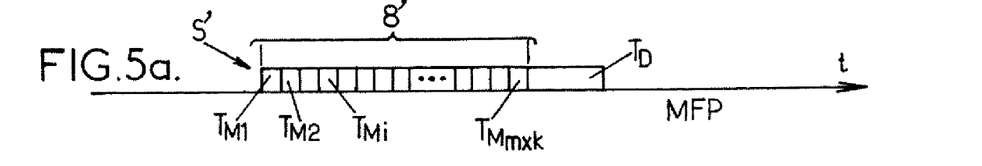
FIG. 5a represents a signal S' emitted according to the MFP mode in an embodiment of the invention.

If the formulation mode selected is the MFP mode, then the wireless interface module 5 constructs a signal S'. This signal S' is represented in FIG. 5a, such as emitted on the radio channel 4 as a function of time t. S' comprises a preamble 8' followed by the data frame $T_D$. The preamble 8' comprises a series of m*k micro-frames (m an integer strictly greater than 1), $T_{M1}, T_{M2} \ldots T_{Mm*k}$. The micro-frames are of reduced length with respect to the data frame $T_D$. Each micro-frame $T_{Mj, j=1 \text{ to } m*k}$ of the series comprises an indication of the number of micro-frames of the series separating the frame from the data frame $T_D$ which follows the preamble 8'. For example in the embodiment considered, each frame $T_{Mj, j=1 \text{ to } m*k}$ comprises the number (m*k−j) in a dedicated field of the frame.

Then the signal S' thus formulated is transmitted to the antenna 6 of node X for emission on the channel 4. In the embodiment considered, the frames $T_{Mj, j=1 \text{ to } m*k}$ furthermore comprise a signature of the data frame $T_D$, for example obtained by applying a hash function to the data frame $T_D$.

Figure 6:
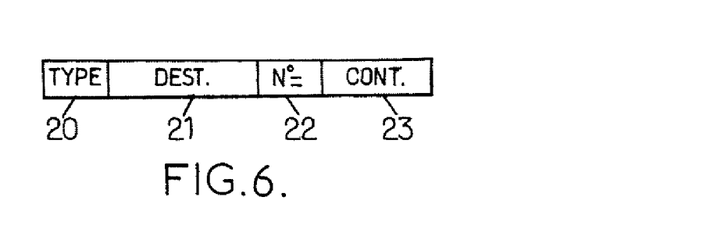
FIG. 6 represents the structure of a frame of the preamble of a signal emitted in an embodiment of the invention.

In the embodiment considered, each frame, $T_{Di, i=1 \text{ to } k}$ for the DFP mode and $T_{Mj, j=1 \text{ to } m*k}$ for the MFP mode, of the preambles 8,8' of the signal S,S', formulated by the wireless interface module 5 comprises the fields indicated in FIG. 6.

Thus the processing module 5 indicates in a frame, $T_{Di, i=1 \text{ to } k}$ or $T_{Mj, j=1 \text{ to } m*k}$:

- in a "TYPE" field 20, the formulation mode selected: MFP or DFP,
- in a "DESTINATION" field 21, the MAC address of node Y recipient of the signal S, S',
- in an "N°" field 22, the indication of the number of frames of the preamble separating the frame considered from the data frame $T_D$ which follows the preamble, i.e., in the present case (k−i) for a frame $T_{Di, i=1 \text{ to } k}$ of the DFP mode and (m*k−j) for a frame $T_{Mj, j=1 \text{ to } m*k}$ of the MFP mode,
- in a "CONTENT" field 23, the copy of the data frame $T_D$ for a frame $T_{Di, i=1 \text{ to } k}$ of the DFP mode, and the signature of the data frame $T_D$ for a frame $t_{Mj, j=1 \text{ to } m*k}$ of the MFP mode.

Each node 2 is adapted so as to be in active radio listening mode (radio turned on) at wakeup moments and to be in inactive radio listening mode (radio turned off) between the wakeup moments, the moments of active and inactive radio listening mode of the various receiver nodes not necessarily being concomitant. The control means 7 are adapted for sending the nodes to sleep and waking them up.

Figure 8:
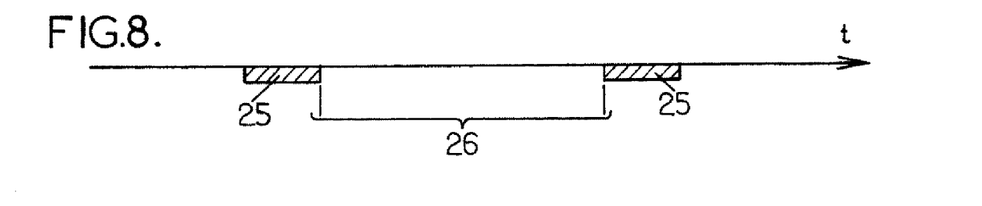
FIG. 8 represents the periodic wakeups of a node.

With reference to FIG. 8, a node 2 is in active radio listening mode (radio turned on) during waking moments represented by the rectangles 25 along the time axis t, which are spaced out by long inter-waking periods 26, during which the receiver node 2 is in inactive radio listening mode.

The preambles 8, 8' are of a duration greater than or equal to the duration Tw separating the starts of the consecutive periodic waking moments of the nodes 2 of the network 1, in the course of which the nodes are in active radio listening mode (radio turned on). This makes it possible to guarantee that the preamble will be broadcast during a wakeup moment of each node.

In the case described, the duration of the preambles 8, 8' is therefore equal to the duration Tw. Let Tw=m*k*f, where f is equal to the duration of emission of a micro-frame $T_{Mj, j=1 \text{ to } m*k}$ of the MFP mode, m*f being equal to the duration of emission of a frame $T_{Di, i=1 \text{ to } k}$ of the DFP mode.

In the case considered, the duration of the waking moments 25 is equal to m*f seconds, i.e. the duration of a frame $T_{Di}$ of a preamble formulated in the DFP mode.

In an embodiment of the invention, the wireless interface module of node Y is adapted for estimating, regularly or sporadically, a transmission error rate $TE_Y$ on the radio channel 4, for example on the basis of the signals exchanged by node Y with the neighbouring nodes.

Then, as a function of this measured error probability $TE_Y$, the wireless interface module 5 of node Y selects a mode of reception from among two modes of reception, called PR (persistent reception) and NPR (non-persistent reception), as illustrated in FIG. 7.

Every Tw seconds, the node 2, for example node Y, by way of its processing module 5, checks, during the listening moment 25, whether there is a signal transmitted on the channel 4. If node Y determines that the channel 4 is free, it returns to an inactive state of radio listening (radio turned off) at the termination of the listening moment 25.

On the other hand, if it detects, during the listening moment 25, that the channel is occupied, it performs operations, in particular detection of synchronization bits, to allow correct receipt of a preamble frame.

In the case where node Y has selected the NPR reception mode, as long as the periodic waking moment 25 has not finished and the channel is occupied, node Y listens to the radio channel so as to receive a correct preamble frame, that is to say a frame whose fields have been received without error. A reception error is detected by node Y for example with the aid of a cyclic redundancy check or CRC. Then if at the termination of the periodic waking moment 25, node Y has not received a correct preamble frame or is not currently receiving an a priori correct frame, it returns to inactive listening mode, even if one or more frames of the preamble are emitted thereafter. If it is currently receiving a preamble frame, it terminates reception thereof, then returns to inactive radio listening mode.

In the case where node Y has selected a PR reception mode, node Y attempts to receive a correct preamble frame as long as the radio channel is not freed. Thus node Y remains in active radio listening mode even beyond the periodic wakeup moment 25, if the transmission of the preamble which has started during the periodic wakeup moment 25 continues after the periodic waking moment 25.

Once a preamble frame has been correctly received, in a PR or NPR reception mode, node Y switches to inactive radio listening mode.

By way of its processing module 5, node Y extracts from the preamble frame received, the content of the "TYPE" field 20, of the "DESTINATION" field 21, of the "N°" field 22 and of the "CONTENT" field 23.

If the "TYPE" field 20 indicates the MFP formulation mode, then the processing module 5 of node Y checks that the content extracted from the "DESTINATION" field 21 of the frame received, for example the micro-frame $T_{Mj}$ of the preamble 8' of the signal S' represented in FIG. 5a, does indeed correspond to the MAC address of node Y.

If this is the case, then the processing module 5 of node Y checks with the aid of the signature of the data frame $T_D$ contained in the field 23 that the data of the data frame have not already been received previously (the signatures of the data frames already received are for example stored in a memory of node Y).

If they have not already been received, the processing module 5 of node Y determines as a function of the number indicated in the field 22 and of the known duration of the transmission of a micro-frame, the duration of occupancy $T_{MFP}$ of the channel until the end of the transmission of the preamble 8', then it provides this duration to the control means 7 of node 2.

Figure 5B:
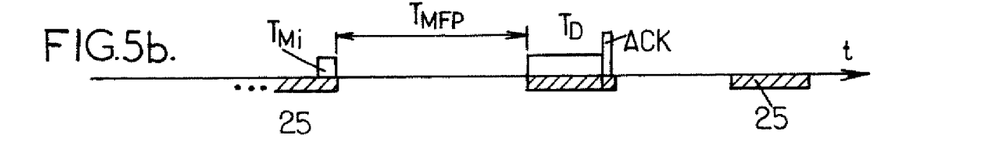

With reference to FIG. 5b, which represents the periods of radio activity with radio turned on as hatched zones of node Y during the transmission of the signal S' such as represented in FIG. 5a. The control means 7 of node Y then order the inactive listening mode to continue, from the end of the receipt of the micro-frame $T_{Mj}$ of the preamble, until the end of this duration of occupancy $T_{MFP}$ of the channel, and order node Y to switch to active listening mode at the conclusion of this duration $T_{MFP}$, to receive the data frame $T_D$.

On completion of the receipt of the data frame $T_D$, an acknowledgement signal ACK is emitted by node Y, then the control means 7 of node Y order the return to inactive listening mode until the next periodic wakeup moment 25.

Node Y is therefore in active listening mode during the transmission of the data frame $T_D$ which follows the preamble 8' in the signal S represented in FIG. 5, so as to receive the data frame $T_D$.

Thus the inactive listening mode being instigated during the transmission of the preamble part which follows a micro-frame $T_{Mj}$ of the preamble 8', the passive listening is reduced, reception of the data frame $T_D$ which follows the preamble 8' in the signal S nevertheless being allowed by the order to wake node Y before its transmission.

In the case where the content extracted from the "DESTINATION" field 21 does not correspond to its MAC address, or in the case where node Y has determined with the aid of the signature that the data of the data frame $T_D$ have already been received, node Y remains in inactive radio listening mode until the next periodic wakeup moment 25.

If the "TYPE" field 20 indicates the DFP formulation mode, then the processing module 5 of the node Y extracts from the "CONT" field 23 of the preamble frame received, for example the frame $T_{D2}$ of the preamble 8 of the signal S represented in FIG. 4a, the copy of the data of the data frame $T_D$.

The processing module 5 of node Y determines as a function of the number indicated in the field 22 and of the known duration of the transmission of a frame of a preamble formulated in DFP mode, the duration of occupancy $T_{DFP}$ of the channel until the end of the transmission of the signal S, then it provides this duration to the control means 7 of node Y.

Figure 4B:
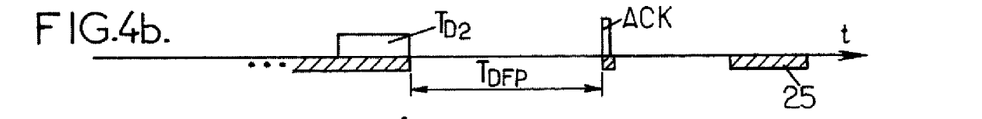

With reference to FIG. 4b, which represents the periods of radio activity with radio turned on as hatched zones of node Y during the transmission of the signal S such as represented in FIG. 4a, the control means 7 of node Y thus order the inactive listening mode to continue, from the end of the receipt of the frame $T_{D2}$ of the preamble, until the end of this duration of occupancy $T_{DFP}$ of the channel, and order node Y to wake up at the conclusion of this duration, so as to emit an acknowledgement message ACK, intended for node X and relating to the data received, on the freed radio channel 4. Once the acknowledgement signal has been emitted, the control means 7 of node Y order it to return to inactive listening mode until the next periodic wakeup moment 25.

Node Y is therefore in inactive listening mode during the transmission of the part of the preamble 8 which follows the frame $T_{D2}$ and during the transmission of the data frame $T_D$. No energy is therefore expended by node Y to determine whether the transmission of the signal S has terminated, thus freeing the channel and allowing the transmission by node Y of an acknowledgement signal. The waking of node Y is programmed at the conclusion of the time span $T_{DFP}$.

The acknowledgement signal ACK is emitted at the end of the transmission of the signal S. Node X therefore does not have to listen to the radio channel between the emission of two frames $T_{D2}$ of the preamble 8. This transmission of the acknowledgement signal ACK subsequent to the signal S does not give rise to an increase in the passive listening since a node which has already received a frame of the preamble 8 of the signal S is toggled to inactive listening mode subsequent to this reception until the propitious moment suitable for dispatching the acknowledgement signal.

Furthermore, the time of a periodic wakeup moment is reduced to the duration of emission of a frame of the preamble 8, further decreasing the passive listening of the nodes (the time $T_{ACK}$ of the conventional WOR procedure being reduced to zero by virtue of the invention).

Various techniques known in the prior art are usable to estimate the transmission error rates on the radio channel 4, used to select a mode of signal formulation from among the DFP and MFP modes and/or a mode of reception from among the PR and NPR modes.

In an embodiment, the transmission error rate is estimated by a node on the basis of the micro-frames received on the channel 4 by this node. It is taken equal to the ratio of the number of incorrect micro-frames detected, with the aid of the CRC for example, to the number of total micro-frames received by the node 2.

In an embodiment, transmission error rates relating to the exchanges with each of the neighbouring nodes are calculated by a node, with a view to selecting a mode of formulation of a signal intended for this neighbouring node. Therefore, for the calculation of such an error rate, relating to a neighbouring node, only the micro-frames received by the node and emitted by the neighbouring node are considered.

Each of the preamble formulation modes DFP, MFP comprises respective advantages. In the MFP mode, on the basis of the serial number indicated in a micro-frame of the preamble, the receiver node deduces when the data frame will be transmitted. As a function of the destination address, it deduces whether or not it is appropriate to receive it. As a function of the signature, it can determine whether or not it has already received it. Consequently, it can decide to place itself in inactive listening mode during the transmission of the data frame if appropriate, thus reducing energy consumption by deciding not to receive the data frame. The duration of listening for reception of a micro-frame is short, but it is necessary to provide for a return to active mode to receive the data frame, which is emitted only once. If the data frame is not received correctly, it will be necessary to wait for the possible return of a signal S or S' comprising the data frame.

In the DFP mode, an advantage is that a node in a wakeup moment receives the data frame or a copy directly. It does not need to wake up subsequently to receive it. Moreover, duplication of the data frame increases the reliability of transmission. However, the node cannot avoid receiving non-relevant data, thereby consuming energy unnecessarily.

Additionally, each of the persistent/non-persistent reception modes comprises respective advantages. For example, the non-persistent reception mode is advantageous, in terms of reducing energy consumption, in the channels with high error rate and/or in which errors occur in bursts at sporadic instants (the receiver node will then turn its radio off during the error burst), while the persistent reception mode is advantageous in the channels with low error rate.

Figure 9:
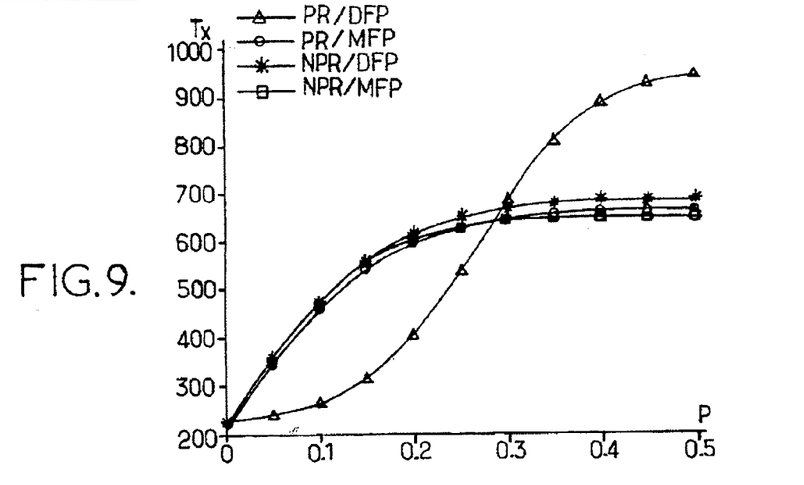
FIG. 9 represents a graph representing a mean duration of radio activity, comprising the activity in emission and the activity in reception, as a function of the probability of error on the radio channel.
Figure 10:
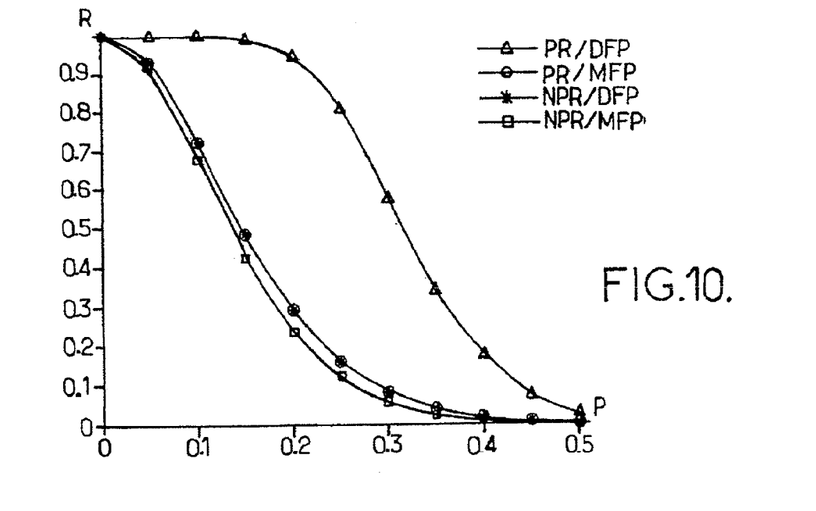
FIG. 10 represents the transmission reliability as a function of the probability of error on the radio channel.

In an embodiment of the invention, a node selects a mode from among the MFP and DFP signal formulation modes and/or a mode from among the PR and NPR reception modes as a function of the transmission error rate measured on the channel 4 and as a function of at least one of the curves represented in FIGS. 9 and 10.

In FIG. 9 is represented, as a function of the probability of micro-frame related error on the radio channel, a mean duration of radio activity $T_x$, comprising the duration of radio activity in emission $T_{tx}$ and in reception $T_{rx}$, for a node of the network using a DFP or MFP formulation mode, and using a PR or NPR reception mode. Four curves are thus represented, corresponding to four modes of operation: PR/DFP, PR/MFP, NPR/DFP, NPR/MFP. The mean duration of radio activity is proportional to the energy consumed by the node.

In FIG. 10 is represented, as a function of the probability of micro-frame related error on the radio channel, a mean transmission reliability R, for a node of the network using a DFP or MFP formulation mode, and using a PR or NPR reception mode. Four curves are thus represented: PR/DFP, PR/MFP, NPR/DFP, NPR/MFP.

Specifically, in a network such as the network 1, a node dispatches an acknowledgement signal once it has received a data frame which was intended for it. Thus if the node which transmitted this data frame does not receive any acknowledgement signal, it repeats the transmission, called simple transmission, of a signal S or S' comprising the data frame until it receives such an acknowledgement signal or until it attains a determined maximum number $n_{max}$ of simple transmissions of a signal S or S' comprising the data frame. The mean transmission reliability is the probability of a successful transmission of the data frame taking into account this possibility of retransmitting it $n_{max}$ times in the event of failure.

The curves represented in FIGS. 9 and 10 have been plotted for a channel of BSC type (Binary Symmetric Channel), in which each bit has an independent and constant error probability. The value of $n_{max}$ has been taken equal to 3, m is equal to 10 (i.e. the frames $T_{Di}$ of a preamble formulated according to the DFP mode are 10 times as wide as the micro-frames $T_{Mi}$ curves of a preamble formulated according to the MFP mode) and k=20.

The selection of a mode of signal formulation and/or of a mode of reception of the signal is carried out, in an embodiment of the invention, by a node in the following manner.

Let TE be the error rate measured by the node. As a function of this error rate TE, of the curves represented in FIG. 9 and/or in FIG. 10 and optionally of additional constraints which it is given, it determines the mode of operation to be selected.

For example, let TE=0.4, be the error rate measured by the node on the channel 4. If the rule taken into account by the node for selecting the mode of operation is minimum energy consumption, the node then selects the NPR/MFP mode of operation, which is the mode of operation exhibiting minimum energy consumption for a probability of error taken equal to the value 0.4 of the measured error rate TE.

On the other hand, if the rule taken into account by the node for selecting the mode of operation is maximum reliability of transmission, the node then selects the PR/DFP mode of operation, which is the mode of operation exhibiting maximum reliability of transmission for a probability of error taken equal to the value 0.4 of the measured error rate TE.

In one mode of operation, the rule taken into account by the node is minimum energy consumption for a guaranteed threshold reliability value. The mode of operation is then chosen as a function of the curves of FIG. 9 and the curves of FIG. 10, for a probability of error p equal to the measured error rate TE.

In the case considered, the curves of FIGS. 9 and 10 have been traced in the manner described below.

Let $p_f$ be the probability of a failure of transmission of a signal S, S' in the channel considered. Then, the transmission reliability R is such that $R=1-p_f^{n_{max}}$.

If T is the duration of radio activity for a simple transmission of a signal S, S' comprising a preamble and a data frame (T=m*k+m), then the total duration of radio activity for transmission of this data frame is $T_{tx}$, with:

$$T_{tx} = \frac{1 - p_f^{n_{max}}}{1 - p_f^{n_{max}}} T;$$

and the duration of radio activity for reception is $T_{rx}$, with:

$$T_{rx} = \frac{1 - p_f^{n_{max}}}{1 - p_f} [p_f * F + (1 - p_f) * S];$$

with S (respectively F) a random variable which expresses the time that the receiver node spends in radio activity for reception in the event of successful (respectively unsuccessful) simple transmission.

The values of S, F and $p_f$ are thereafter determined for each of the four modes of operation PR/DFP, PR/MFP, NPR/DFP, NPR/MFP.

In the NPR/DFP case, $$F = \frac{k-1}{k} * 2m + \frac{1}{k} * (U_m + m),$$

where $U_m$ is a random variable uniform in [0,m[; $S=U_m+m$ and $p_f=1-(1-p)^m$.

In the NPR/MFP case, $F=p*2+(1-p)*(U_1+1+m)$, where $U_1$ is a random variable uniform in [0,1[; $S=U_1+1+m$ and $p_f=1-(1-p)^{m+1}$.

In the PR/DFP case, $$p_f = \frac{q}{k} * \frac{1 - q^k}{1 - q},$$

with $q=1-(1-p)^m$; $F=U_m+m*(X/_{failure})+m$ and $S=U_m+m*(X/_{success})+m$, with $X=p_f*X/_{failure}+(1-p_f)*X/_{success}$ where X is a discrete random variable expressing the number of corrupted data frames (of the type $T_D$ and $T_{Di}$) received during the preamble transmission, $X \in \{0, \ldots, k-1\}$, $X/_{failure}$ (respectively $X/_{success}$) is a discrete random variable expressing the number of corrupted frames received in the preamble knowing that simple transmission fails (respectively succeeds). The variable $X/_{failure}$ satisfies $P[X/_{failure}=j]=1/k$.

Finally, in the PR/DFP case, $p_f=q$; $F=U_1+Y_1+m$ and $S=U_1+Y_1+m$, where $Y_1 \in \{0, \ldots, mk-1\}$ is a random variable expressing the number of micro-frames received, corrupted or otherwise, and satisfies:

$$P[Y_1 = j] = \frac{1}{mk}[(mk - j)p^{j-1} - (mk - j - 1)p^j].$$

In the above-described embodiment of the invention, each node of the network is a receiver and an emitter. In an embodiment, a node can be exclusively an emitter or exclusively a receiver.

All or some of the steps implemented by a node according to the invention are carried out in an embodiment during an execution, by processing means of the node and corresponding instructions of a computer program.

The technique for adapting the node in an embodiment of the invention thus makes it possible to prolong the life of ad hoc networks, and more generally, it makes it possible to reduce energy consumption in telecommunication networks, by allowing a node to adapt its mode of formulation of a signal to be emitted and/or its mode of reception of the signal as a function of at least the error rate measured on the radio channel, and if appropriate while complying with constraints imposed on the reliability of transmission.

The invention claimed is:

1. Method of communication, on a radio channel, between at least two nodes, the method comprising:
   emitting by the two nodes on the channel in an alternating manner and listening by the two nodes to the radio channel intermittently, such that the nodes are in an active radio listening mode at brief and periodic wakeup moments of determined duration, spaced out by long inter-waking periods, during which they are in an inactive radio listening mode;
   determining a signal transmission error probability on the channel;

selecting a transmission mode as a function of at least the determined transmission error probability,
wherein:
the transmission mode is selected from at least a first and a second mode of formulating a signal comprising a preamble and a data frame, the preamble comprising a series of frames which comprises at least one first frame indicating a number of frames of the preamble separating the first frame from the data frame and furthermore indicating the mode selected,
the format of the signal in the formulation of the second mode is the same as that in the first mode with the exception that the at least one first frame in the preamble of the signal formulated in accordance with the first mode comprises a copy of the data frame, and
at least one first frame in the preamble of the signal formulated in accordance with the second mode comprises a signature of the data frame and being of reduced size with respect to the data frame;
the method further comprising:
formulating, by one of the two nodes, termed the emitter, of the signal;
emitting, by the said emitter node, of the signal thus formulated on the radio channel;
wherein:
the preamble of the signal is of a duration greater than or equal to a duration separating a start of two consecutive periodic wakeup moments and a duration of the wakeup moments is equal to a duration of said at least one first frame formulated in accordance with the first mode.

2. Method according to claim 1, comprising the following steps, following the reception, by the other node, termed the receiver, of the said first frame:
determination, as a function of the number indicated by the said first frame received, of the time span, as a duration of occupancy of the channel, until the completion of the emission of the data frame of the signal;
switchover to an inactive radio listening mode of the said receiver node during the said determined time span.

3. Method according to claim 1, comprising the following steps, following the receipt, by the other node, termed the receiver, of the said first frame:
determination, as a function of the number indicated by the said first frame received, of the time span until the completion of the emission of the data frame of the signal;
emission of an acknowledgement of receipt relating to the said first frame received at the conclusion of the said determined time span.

4. Method according to claim 1, comprising the following step:
selecting at least one of a first and second mode of formulating a signal comprising a preamble and the data frame, the preamble comprising a series of frames which comprises at least one first frame indicating a number of frames of the preamble separating the said first frame from the data frame and furthermore indicating the mode selected,
the first mode being the formulation, by the emitter, of the signal comprising the preamble comprising a series of frames, followed by the data frame, at least one first frame of the preamble comprising the copy of the data frame and indicating the number of frames of the preamble separating the said first frame from the data frame;
wherein the format of the signal in the formulation of the second mode is the same as that in the first mode with the exception that the frames of the series of frames in the preamble of the signal formulated in accordance with the second mode are of reduced size with respect to the data frame;
then formulation of the signal in accordance with the selected mode; and
emission, by the node, of the signal thus formulated on the radio channel.

5. Method according to claim 4, furthermore comprising the following step:
determination, by the emitter node, of a transmission error rate on the channel;
the mode of formulating the signal being selected by the said node as a function of at least the said determined error rate.

6. Method according to claim 4, comprising the following steps, executed by the other node, termed the receiver:
following receipt of the said first frame, reading of the mode indicated by the frame received;
determining, as a function of the number indicated by the said frame received, of a time span, as a duration of occupancy of the channel, until the emission of the data frame of the signal;
switching to an inactive radio listening mode of the receiver node during the determined time span;
if the mode indicated by the said frame received is the second mode, switching to an active radio listening mode of the receiver node at the conclusion of the determined time span calculated so as to receive the said data frame.

7. Method according to claim 4, wherein the selection by the emitter node between the first and the second mode of formulating the signal is carried out with a view to the exchanges with a neighboring node as a function of an error rate relating to the channel determined as a function of the exchanges between the said emitter node and the said neighboring node with the exclusion of the exchanges with the other nodes.

8. Method according to claim 4, wherein the selection between the first and the second mode of formulating the signal is made as a function of one or more elements from among a value representative of an energy expenditure determined as a function of a probability of error on the channel, a value of overall transmission reliability on the network determined as a function of the probability of error on the channel, and a fixed transmission reliability threshold value.

9. Method according to claim 1, comprising the following steps:
determining, by the other node, termed the receiver, of a transmission error rate on the channel;
selecting, as a function of at least the said determined error rate, by the receiver node, of a mode between at least one first and one second mode of receiving the signal comprising a preamble comprising a series of frames, followed by the data frame;
wherein, according to which in the first mode of reception, if the receiver node detects a transmission of a first preamble frame on the channel, the said node remains in active radio listening mode until it receives a correct frame of the preamble or until the receiver node determines that the channel is freed; and
wherein, according to which in the second mode of reception, if the receiver node detects a transmission of a second frame of a preamble on the channel, the said node switches to inactive radio listening mode after receipt of an incorrect frame of the preamble while at least one frame of the said preamble is emitted on the channel after the said incorrect frame.

10. Method according to claim 9, wherein the selection by the receiver node between the first and the second mode of receiving the signal is carried out with a view to the exchanges with a neighboring node as a function of an error rate relating to the channel determined as a function of the exchanges between the said receiver node and the said neighboring node with the exclusion of the exchanges with the other nodes.

11. Method according to claim 9, wherein the selection between the first and the second mode of receiving the signal is made as a function of one or more elements from among a value representative of an energy expenditure determined as a function of a probability of error on the channel, a value of overall transmission reliability on the network determined as a function of the probability of error on the channel, and a fixed transmission reliability threshold value.

12. An emitter station for forming a node, the station comprising:
a radio emitter configured to:
emit on a radio communication channel in half-duplex;
determine a signal transmission error probability on the channel;
select a transmission mode as a function of at least the determined transmission error probability; and
a listening element configured to:
listen to the radio channel intermittently,
wherein:
said node is adapted to be in an active radio listening mode at brief and periodic wakeup moments of determined duration, spaced out by long inter-waking periods, during which it is in an inactive radio listening mode;
the transmission mode is selected from at least a first and a second mode of formulating a signal comprising a preamble and a data frame, the preamble comprising a series of frames which comprises at least one first frame indicating a number of frames of the preamble separating the first frame from the data frame and furthermore indicating the mode selected,
the format of the signal in the formulation of the second mode is the same as that in the first mode with the exception that the at least one first frame in the preamble of the signal formulated in accordance with the first mode comprises a copy of the data frame, and
at least one first frame in the preamble of the signal formulated in accordance with the second mode comprising a signature of the data frame and being of reduced size with respect to the data frame;
the radio emitter further configured to:
formulate, with a view to transmitting a data frame, the signal according to the selected mode; and
emit the signal thus formulated on the radio channel;
wherein:
the preamble of the signal is of a duration greater than or equal to a duration separating a start of two consecutive periodic wakeup moments and a duration of the wakeup moments is equal to a duration of said at least one first frame formulated in accordance with the first mode.

13. A receiver station for forming a node able to listen intermittently to a radio channel, the said station comprising:
a radio receiver configured to;
determine at least one first frame comprising a copy of a data frame, the said first frame being a frame of a series of frames of a preamble of a signal emitted on the channel, the said signal comprising the said preamble followed by the said data frame,
the said first frame indicating a number of frames of the preamble separating the said frame from the data frame and furthermore indicating the mode selected between a first and a second mode based on a transmission probability,
said at least one first frame in the preamble of the signal formulated in accordance with the first mode comprising a copy of the data frame,
said at least one first frame in the preamble of the signal formulated in accordance with the second mode comprising a signature of the data frame and being of reduced size with respect to the data frame;
determine, as a function of a number read from the said first frame received and indicating a number of frames of the series of frames separating the said first frame from the data frame, a time span, as a duration of occupancy of the channel, until the completion of the emission of the data frame of the signal; and
switch to an inactive radio listening mode during the determined time span.

14. Network comprising:
at least one node comprising an emitter station as claimed in claim 12 and
a radio receiver configured to:
determine at least one first frame comprising a copy of a data frame, the said first frame being a frame of a series of frames of a preamble of a signal emitted on the channel, the said signal comprising the said preamble followed by the said data frame,
the said first frame indicating a number of frames of the preamble separating the said frame from the data frame and furthermore indicating the mode selected between a first and a second mode,
said at least one first frame in the preamble of the signal formulated in accordance with the first mode comprising a copy of the data frame,
said at least one first frame in the preamble of the signal formulated in accordance with the second mode comprising a signature of the data frame and being of reduced size with respect to the data frame,
determine, as a function of a number read from the said first frame received and indicating a number of frames of the series of frames separating the said first frame from the data frame, a time span until the completion of the emission of the data frame of the signal; and
switch to an inactive radio listening mode of the radio reception means of the node during the determined time span.

15. A non-transitory storage medium, installed on a radio emitter, having computer program instructions stored thereon, that when executed on the radio emitter cause the emitter to:
determine a signal transmission error probability on the channel;
select a transmission mode as a function of at least the determined transmission error probability,
wherein:
the transmission mode is selected from at least a first and a second mode of formulating a signal comprising a preamble and a data frame, the preamble comprising a series of frames which comprises at least one first frame indicating a number of frames of the preamble separating the first frame from the data frame and furthermore indicating the mode selected,
the format of the signal in the formulation of the second mode is the same as that in the first mode with the exception that the at least one first frame in the preamble of the signal formulated in accordance with the first mode comprises a copy of the data frame, and at least one first frame in the preamble of the signal formulated in accordance with the second mode comprising a signature of the data frame and being of reduced size with respect to the data frame;

the computer program instructions further causing the emitter to:

formulate with a view to transmitting a data frame, the signal according to the selected mode; and emit the signal thus formulated on the radio channel;

wherein:

the preamble of the signal is of a duration greater than or equal to a duration separating a start of two consecutive periodic wakeup moments and a duration of the wakeup moments is equal to a duration of said at least one first frame formulated in accordance with the first mode.

16. A non-transitory storage medium, installed on a radio receiver, having computer program instructions stored thereon, that when executed on the radio receiver cause the receiver to:

determine at least one first frame comprising a copy of a data frame, the said first frame being a frame of a series of frames of a preamble of a signal emitted on the channel, the said signal comprising the said preamble followed by the said data frame, the said first frame indicating a number of frames of the preamble separating the said frame from the data frame and furthermore indicating the mode selected between a first and a second mode, said at least one first frame in the preamble of the signal formulated in accordance with the first mode comprising a copy of the data frame, said at least one first frame in the preamble of the signal formulated in accordance with the second mode comprising a signature of the data frame and being of reduced size with respect to the data frame;

determine, as a function of a number read from the said first frame received and indicating a number of frames of the series of frames separating the said first frame from the data frame, a time span, as a duration of occupancy of the channel, until the completion of the emission of the data frame of the signal; and switch to an inactive radio listening mode during the determined time span.

* * * * *